United States Patent [19] [11] 3,965,051
Markusch et al. [45] June 22, 1976

[54] COMPOSITE MATERIALS
[75] Inventors: Peter Markusch, Cologne; Dieter Dieterich, Leverkusen, both of Germany
[73] Assignee: Bayer Aktiengesellschaft, Leverkusen, Germany
[22] Filed: Nov. 26, 1974
[21] Appl. No.: 527,388

[30] Foreign Application Priority Data
Nov. 30, 1973 Germany.............................. 2359611

[52] U.S. Cl. .......................... 260/2.5 AK; 260/37 N
[51] Int. Cl.² ............................................. C08J 9/00
[58] Field of Search ..... 260/37 N, 2.5 AD, 2.5 AM, 260/77.5 AD

[56] References Cited
UNITED STATES PATENTS
| | | |
|---|---|---|
| 3,384,606 | 5/1968 | Dieterich et al......... 260/29.2 TN X |
| 3,388,087 | 6/1968 | Dieterich et al............. 260/29.2 TN |
| 3,419,533 | 12/1968 | Dieterich...................... 260/37 N X |
| 3,491,050 | 1/1970 | Keberle et al. ............... 260/37 N X |
| 3,822,238 | 7/1974 | Blair et al. ................ 260/2.5 AD X |

FOREIGN PATENTS OR APPLICATIONS
874,430  8/1961  United Kingdom............... 260/37 N Primary Examiner—Lewis T. Jacobs
Attorney, Agent, or Firm—Joseph C. Gil; Gene Harsh

[57] ABSTRACT

Inorganic or organic particles or fibers are bonded together with an organic polyisocyanate containing ionic groups to form a composite material for filling cracks, joints or the like or for making panels or other products used in the building industry.

15 Claims, No Drawings

COMPOSITE MATERIALS

It is known to produce composite materials from particulate or fibrous materials and binders containing organic compounds. Organic compounds which still contain reactive groups which are capable of undergoing polymerization, polycondensation or polyaddition reactions to produce high-molecular weight organic products are particularly important in this connection. Polyesters and epoxide resins are examples of compounds of this kind which, in combination with particulate or fibrous materials, are capable of giving rise to a wide assortment of high-quality composite materials.

There have also been several attempts to use organic polyisocyanates for this purpose. For example, sawdust or straw can be bonded with polyisocyanates to produce quite serviceable chipboard. There have also been attempts to add polyisocyanates or solutions thereof to cement compositions in order to achieve more rapid setting and to obtain more useful properties in flooring surfaces and wall surfaces after hardening, as described in German Offenlegungsschrift Pat. Nos. 1,924,468; 2,113,042; 2,113,043 and 2,300,206. The disadvantages of many of these possible methods of combining particulate or fibrous materials with organic components lie in the frequent problems of mixing, insufficient resistance to hydrolysis and, above all, problems of bonding. This last mentioned problem can be partly solved by using so-called bonding agents, but even then difficulties may occur. For example, if the bonding agents are low-molecular weight compounds they are liable to migrate or exude out of the mixture whereas, if they are higher-molecular weight compounds, they are often difficult to incorporate in the composition and the composite material obtained will have inferior mechanical properties because these higher-molecular weight compounds only too often have a plasticizing effect. Mixing problems occur especially if the organic compounds which are capable of undergoing polymerization, polyaddition or polycondensation reactions are required to be mixed with aqueous systems but are themselves so hydrophobic that they are completely incompatible with aqueous systems.

British Pat. Specification No. 1,192,864 (German Offenlegungsschrift Pat. No. 1,924,468) describes cement compositions which contain, as their major components, a hydraulic cement, a silicon dioxide filler, water and an organic compound which contains several isocyanate groups.

It is also proposed in the British Patent Specification to add to the cement compositions an organic compound which is capable of reacting with isocyanate groups and optionally also solvents. But even then the problem of achieving sufficiently thorough mixing of the various constituents cannot be adequately solved, a difficulty which has been pointed out in German Offenlegungsschrift Pat. No. 2,300,206 as a criticism of the prior art. According to the teaching in the German document, the components (hydraulic cement, silicon dioxide filler, water and an organic compound which contains several isocyanate groups) are completely incompatible with each other.

Water and the diisocyanate are not miscible and the compositions usually contains, in addition, an organic compound which is reactive with isocyanates, e.g. divalent or trivalent polyethers or polyesters which may in some cases be incompatible with the isocyanate and/or water. In order to achieve sufficient mixing of the various constituents it is therefore sometimes necessary to use an organic solvent. The use of a solvent considerably increases the cost of the compositions as well as entailing a fire risk. Furthermore, the tools and other apparatus used for preparing and applying the composition must be cleaned with solvents, which again gives rise to the disadvantages already mentioned above.

According to the teaching of German Offenlegungsschrift Pat. No. 2,300,206, it has been found that the system containing cement becomes compatible with water if the compositions contain a water-soluble organic polymer. In that case, water may also be used instead of organic solvents for diluting the compositions and for cleaning the apparatus used for preparing and applying them.

Offenlegungsschrift Pat. No. 2,300,206 therefore proposes a harder composition which comprises a mixture of a hydraulic cement, a filler, water, an organic polyisocyanate and a water-soluble polymer in sufficient quantities to ensure that, after the mixing operation, the composition will remain compatible with water and dispersible until the composition begins to set.

A common feature of all of the proposals referred to above is the disadvantage that, in addition to the organic polyisocyanate, the compositions in all cases require another organic compound, either a polyol, a solvent or, as in the last mentioned case, a water-soluble polymer in order to render the polyisocyante, which is by nature hydrophobic, compatible with or dispersible in water.

It is an object of this invention to obviate the above described disadvantages of the known compositions and, in addition, to produce novel composite materials which have the particular advantage of being more easily prepared as well as having excellent bonding between the individual components. Another object of the invention is to provide a process for bonding particles or fibers together to form composite materials. Still another object of the invention is to provide a method of improving the bonding of particles and fibers with a polymer or polyaddition product prepared with an organic polyisocyanate. A still further object of the invention is to provide an improved shaped article prepared by bonding particles or fibers together with a reaction product prepared with an organic polyisocyanate.

The foregoing objects and others are accomplished in accordance with this invention, generally speaking, by providing a process for bonding inorganic or organic particles or fibers together with a bonding agent prepared with an organic polyisocyanate containing ionic groups.

The presence of ionic groups in polyisocyanates provides mainly two very decisive advantages:

1. The ionic groups produce interactions between the surfaces of the particulate or fibrous materials, which have an advantageous effect on bonding. This effect is particularly marked in cases where inorganic particles are required to be bonded with each other. Because the surfaces of such particles are almost never completely neutral but are in most cases positively or negatively charged, the use of polyisocyanates which have been modified with ionic groups either results directly in the formation of ionic bonds or produces extremely firm bonds, possibly of the order of heterolytic dissociation energies, due to the interaction of charges of opposite sign between the substrate and the binder. Thus, for bonding silicate-type surfaces, for example, which are in most cases negatively charged, it is advisable to use cationically modified organic polyisocyanates. In all cases, the polyisocyanates which contain ionic groups are superior in their bonding properties to unmodified, neutral polyisocyanates. Even if the substrate which is to be bonded does not comprise organic particles, the interacting forces described above operate, even if to a slightly reduced extent, especially in the case of organic polymers which themselves contain polar or mesomeric groups in some form, since even polarization and induction effects are sufficient to produce the required interaction with the ionic groups of the polyisocyanate and hence achieve improved bonding properties. One feature which must be particularly emphasized is that the bonding between the substrate and the binder is the most decisive factor in determining the quality of a composite material. If the bonding between the phases is improved, the properties in use of the composite material are also improved.

2. The polyisocyanates which contain ionic groups have the further important advantage that, in the case of aqueous systems they can be very finely divided in the inorganic-aqueous phase without the aid of emulsifying agents or solvents.

The distribution of organic and aqueous inorganic phases achieved by using polyisocyanates which contain anionic and/or cationic groups is so uniform that sols are formed in which the disperse phase has dimensions of between about 20 nm and 2 $\mu$, preferably between 50 nm and 700 nm, so that the chemical interactions increase by several orders of magnitude.

Organic polyisocyanates which contain ionic groups are particularly suitable for use in connection with aqueous systems which also contain lime or cement because, apart from their excellent emulsifying properties, they liberate carbon dioxide in the reaction with water and thereby promote rapid hardening of the cement or lime compositions. Another particular advantage is that the carbon dioxide evolved may have the effect of forming pores in such compositions so that the desired effect of resistance to frost can be achieved in such products.

This invention thus provides a process for the production of composite materials from
a. an organic polyisocyanate, and
b. an inorganic and/or organic particulate and/or fibrous material; and
c. optionally other auxiliary substances and additives; wherein the organic polyisocyanate is one which contains ionic groups.

The present invention also provides composite materials which contain polyurea and/or polyurethane and/or polyisocyanurate and/or polycarbodiimide groups which contain ionic groups, produced by the above mentioned process.

The process according to the invention thus results in the production of novel composite materials composed of at least two components:
1. an organic polyisocyanate which contains ionic groups; and
2. an inorganic and/or organic particulate and/or fibrous material.

The polyisocyanates which contain ionic groups may, for example, be products which
a. comprise on an average at least 2 structural units (monomers) of which at least one and not more than half carries an ionic group and which, in addition,
b. contain at least one isocyanate group, preferably as an end group, which makes it possible for polyadducts to be produced.

The polyisocyanates with ionic groups which are to be used in the process according to the invention are therefore compounds of the general formulae $$(A)_x B_y \text{ or } (A)_{x-a} B_y (A)_a$$

in which
A represents a non-ionomeric structural unit and
B represents an ionic structural unit,
x represents an integer of from 1 to 100, preferably 1 to 10,
y represents an integer of from 1 to 50, preferably 1 or 2, and
a represents an integer of from 1 to 50, preferably 1 to 5; furthermore
A may represent the same or different structural units and
A and B may be connected with themselves or with each other, either directly or by way of bridging members, and lastly, at least one of the structural units
A and/or B contains an isocyanate group capable of reacting with a reactive hydrogen atom to build up a polyadduct.

The polyisocyanates which contain ionic groups may also be mixtures of the above mentioned products $(A)_{x1} B_y$ or $(A)_{x1-a} B_y (A)_a$ with $(A)_{x2}$. In these mixtures, associations of the general formulae $$(A)_{x2} \ldots \ldots (A)_{x1} B_y \text{ or}$$

$$(A)_{x2} \ldots \ldots (A)_{x1-a} B_y (A)_a$$

in which
$X_1$ and $X_2 = x$ are formed under the reaction conditions, and these associations may in turn be regarded as polyisocyanates which contain ionic groups.

Any suitable bridging members may be present between the structural units A and/or B such as, for example, urethane-, urea-, amide-, ester-, carbonate-, ether-, thioether-, biuret-, allophanate-, isocyanurate-, uretdione-, carbodiimide-, sulphone-, imide, hydantoin- or triazine groups, and they may occur once or several times in the polyisocyanates which contain ionic groups. The polyisocyante may, of course, contain various of the above mentioned groups side by side. In multi-nuclear isocyanates, the methylene group may also function as a bridging member.

The structural units A and B are aliphatic hydrocarbon radicals containing preferably one to 20 carbon atoms, cycloaliphatic hydrocarbon radicals containing preferably 4 to 14 carbon atoms, aromatic hydrocarbon radicals containing preferably 6 to 14 carbon atoms or araliphatic hydrocarbon radicals containing preferably 7 to 16 carbon atoms, and structural units B may in addition contain ionic groups such as carboxylate-, sulphonate-, phosphonate-, monosulphate-, diphosphate-, ammonium-, sulphonium groups or the like.

The polyisocyanates with ionic groups also include e.g. the reaction products of isocyanates which are chlorinated or brominated in the side chain with tertiary amines, and reaction products of isocyanatothioethers with alkylating agents. The reactive group is the isocyanate group. This may also be present in a masked form, e.g. as uretdione or caprolactam adduct. The polyisocyanates with ionic groups which are to be used in the process according to the invention preferably contain 1 to 10, and in particular 2 to 4 isocyanate groups.

The average molecular weights of the unassociated polyisocyanates which contain ionic groups should be between about 100 and about 8,000, preferably between about 300 and about 5,000. The ionic group content should be between 2 and 200 milliequivalents per 100 g of polyisocyanate and is preferably between 3 and 100 milliequivalents per 100 g.

In cases where the polyisocyanates with ionic groups used for the process according to the invention are liquid compounds, they should fulfill at least one of the following criteria in combination with aqueous systems:
 a. formation of a finely divided oil in water emulsion and
 b. formation of a finely divided water in oil emulsion.

Preferred polyisocyanates with ionic groups are the prepolymers obtained by the so-called isocyanate polyaddition process which have in recent times been frequently described. It is no problem to the man of the art to stop almost any known isocyanate reaction at the prepolymer stage at least temporarily. Among the suitable prepolymers may be included not only the adducts of polyisocyanates with alcohols, mercaptans, carboxylic acids, amines, ureas and amides but also adducts of a polyisocyanate with itself, such as uretdiones, isocyanurates or carbodiimides, which can easily be obtained from monomeric polyisocyanates by a reaction accompanied by increase in molecular weight. The various methods of introducing ionic groups into such prepolymers are also known to the man of the art.

Preparation of the ionic isocyanate prepolymers which are preferred for the process according to the invention is carried out in known manner, for example, by reacting organic polyhydroxyl compounds which have a molecular weight of about 400 to about 5,000, in particular polyhydroxy-polyesters or polyhydroxy-polyethers, which may be mixed with polyhydric alcohols which have a molecular weight below 400, with excess quantities of polyisocyanates, for example with aliphatic, cycloaliphatic, araliphatic, aromatic and heterocyclic polyisocyanates such as those described e.g. by W. Siefken in Justus Liebigs Annalen der Chemie, 562, pages 75 to 136, for example, ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexane (German Auslegeschrift Pat. No. 1,202,785); hexahydrotolylene-2,4- and -2,6-diisocyanate and any mixtures of these isomers; hexahydrophenylene-1,3- and/or -1,4-diisocyanate; perhydro-2,4'- and/or -4,4'-diphenylmethane diisocyanate; phenylene-1,3- and -1,4-diisocyanate; tolylene-2,4- and -2,6-diisocyanate and any mixtures of these isomers; diphenylmethane-2,4'- and/or -4,4'-diisocyanate; naphthylene-1,5-diisocyanate; triphenylmethane-4,4',4''-triisocyanate; polyphenyl-polymethylene polyisocyanates which can be obtained by aniline-formaldehyde condensation followed by phosgenation and which have been described e.g. in British Pat. Specifications Nos. 874,430 and 848,671, perchlorinated aryl polyisocyanates as described e.g. in U.S. Pat. No. 3,277,138; polyisocyanates which contain carbodiimide groups as described in U.S. Pat. No. 3,152,162; the diisocyanates described in U.S. Pat. Specification No. 3,492,330; polyisocyanates which contain allophanate groups as described e.g. in British Pat. Specification No. 994,890; Belgian Pat. Specification No. 761,626 and published Dutch Pat. application No. 7,102,524; polyisocyanates which contain isocyanurate groups as described e.g. in German Pat. Specifications Nos. 1,022,789; 1,222,067 and 1,027,394 and in German Offenlegungsschriften Pat. Nos. 1,929,034 and 2,004,048; polyisocyanates which contain urethane groups as described e.g. in Belgian Pat. Specification No. 752,261 or in U.S. Pat. Specification No. 3,394,164; polyisocyanates which contain acylated urea groups according to U.S. Pat. No. 3,517,039 polyisocyanates which contain biuret groups as described e.g. in U.S. Pat. No. 3,124,605; British Pat. Specification No. 889,050 and U.S. Pat. application Ser. No. 036,500, filed May 11, 1970, polyisocyanates prepared by telomerization reactions as described e.g. in Belgian Pat. Specification No. 723,640; polyisocyanates which contain ester groups such as those mentioned e.g. in British Pat. Specifications Nos. 965,474 and 1,072,956; U.S. Pat. Specification No. 3,567,763 and German Pat. Specification No. 1,231,688 and the reaction products of the above mentioned isocyanates with acetals according to U.S. Pat. No. 3,120,502.

The distillation residues obtained from the commercial production of isocyanates and which still contain isocyanate groups may also be used, optionally dissolved in one or more of the above mentioned polyisocyanates. Any mixtures of the above mentioned polyisocyanates may also be used.

It is generally preferred to use commercially readily available polyisocyanates such as tolylene-2,4- and -2,6- diisocyanate and any mixtures of these isomers ("TDI"); polyphenyl-polymethylene polyisocyanates which can be obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

The ionic modification may be carried out, for example, by adding a tertiary amino alcohol such as dimethylaminoethanol and N-methyl-diethanolamine and then quaternizing with an alkylating agent. Anionic modification, for example, may be carried out using a salt of an amino acid or of an aminosulphonic acid. Carboxy diols such as tartaric acid, dimethylol propionic acid or adducts of acid anhydrides and polyols and salts thereof may also be used for preparing ionic prepolymers. Because of the limited storage life of prepolymers which still contain reactive groups such as hydroxyl groups, free, unneutralized carboxyl groups, urethane and urea groups, it is generally advisable to prepare these prepolymers only shortly before the reaction.

Prepolymers which are known per se, in particular those based on aromatic isocyanates, may also subsequently be modified to form ionomers, for example, by reacting them with sultones or β-lactones, by grafting them, for example, with acrylic, methacrylic or crotonic acid or by reacting them with sulphuric acid, chlorosulphonic acid, oleum or sulphur trioxide. Prepolymer ionomers which are excellently suited for the process according to the invention and in most cases have a high storage stability can also be obtained in particular by reacting aromatic isocyanates such as tolylene diisocyanates, diphenylmethane diisocyanates and the known phosgenation products of condensation products of aromatic monoamines, in particular aniline and aldehydes, in particular formaldehyde, with sulphuric acid, oleum or sulphur trioxide. The sulphonated polyisocyanates obtained in this way, which according to their infra-red spectra generally still contain uretdione, urea and biuret groups formed by side reactions during the sulphonation process and particularly also urethane and/or allophanate groups resulting from the polyol modification carried out before sulphonation, are therefore particularly preferred as prepolymer ionomers.

Even the sulphonation of a simple diisocyanate such as diphenylmethane diisocyanate invariably results in a prepolymer ionomer because sulphonation is accompanied by increase in molecular size, e.g. by way of a urea, biuret, isocyanate or uretdione group.

It is preferred, however, to use prepolymers for the sulphonation reaction, e.g. phosgenation products of higher-molecular weight aniline/formaldehyde condensation products which have a viscosity of 50 to 10,000, preferably 100° to 5,000, centipoises at 25°C.

The usefulness of polyisocyanates which contain ionic groups is by no means restricted to those which are liquid.

Products which are solid at room temperature may, for example, be ground up and used as granulates or powders or they may be melted at elevated temperatures. The powdered or granulated polyisocyanates which contain ionic groups are particularly advantageous because they can be premixed with the material which is to be bonded, thus forming stable composite solid mixtures which can be processed at a later date. The ease of handling of powders and granulates is another important advantage.

Reaction products of 50 to 99 mols of aromatic diisocyanates and 1 to 50 mols of conventional glycols, monoamines, polyether glycols, polythioether glycols and polyester glycols are also particularly preferred. In these products, the ionic center can be introduced by the addition of suitable glycols or, for example, by subsequent sulphonation or grafting e.g. of acrylic acid, maleic acid or crotonic acid or reaction with sulphones or β-lactones or by other known methods.

In order to ensure the desired firm bond and, in addition, the high compatibility of the polyisocyanate ionomers with aqueous systems, it is sufficient to use only a very low ionic group content, e.g. 2 milliequivalents per 100 g and preferably 5 to 100 milliequivalents per 100 g. In special cases, for example, where the isocyanate groups of the prepolymer ionomers are less reactive, the ionic group content may be increased to about 200 milliequivalents per 100 g. The ionic groups need not necessarily be preformed salt groups such as

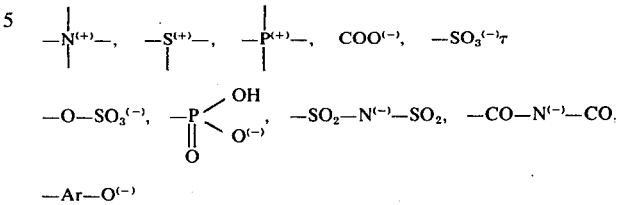

wherein Ar is $C_6$–$C_{14}$ aryl such as phenyl, naphthyl and the like, but may also be groups which are capable of forming salt groups in the presence of alkaline or organic basic compounds, e.g. —COOH, —SO$_3$H, —SO$_2$-NH-SO$_2$—, —CO-NH-CO— or phenolic hydroxy groups. The prepolymer may, of course, contain two or more of the above mentioned groups. Furthermore, prepolymer betains which contain an ionic group and a cationic group in the same molecule or symplexes which contain both anionic and cationic prepolymers at the same time may also be present.

Particularly preferred groups which form ions are tert. —N—, —COOH, —SO$_3$H, and —AR-OH wherein Ar has the above meaning. Among these, the tertiary amino group must be converted into a quaternary ammonium group before use either by means of alkylating agents or inorganic or organic acids.

Ionic modification carried out in the usual manner gives rise to ionomer prepolymers which frequently have a viscosity of more than 2000 cP and occasionally up to 100,000 cP or more at 25°C. In cases where such high viscosities are a disadvantage for further use, the viscosity may be reduced by the addition of low-viscosity isocyanates or inert solvents.

Particularly advantageous polyisocyanate ionomers can be obtained by sulphonating aromatic polyisocyanates. In the simplest case, it is sufficient to react the polyisocyanates with concentrated sulphuric acid or oleum. These products may be used directly as polyisocyanate ionomers or the sulphonation product may first be partly or completely neutralized, e.g. by the addition of amines such as trimethylamine, triethylamine, methyl morpholine, pyridine or dimethyl aniline or metal alcoholates such as sodium tertiary butanolate or potassium isopropanolate. Neutralization may also be carried out with solid metal oxides, hydroxides or carbonates or suspensions of these neutralizing agents in diluents. Calcium oxide, magnesium oxide, calcium carbonate, magnesium carbonate and dolomite, for example, are particularly suitable.

Non-volatile higher-molecular weight tertiary amines are also particularly suitable for neutralization because they remain in the composite materials and do not exude from them and are therefore odorless. Suitable compounds of this kind are, in particular, the alkoxylation products of primary or secondary amines or polyesters or polyacrylates which contain tertiary nitrogen atoms or the known condensation products based on epichlorohydrin and polyamines of the kind which are used, for example, for increasing the wet strength of paper. Polycondensation products of weakly basic or sterically hindered amines are particularly preferred because polyamines are otherwise liable to cause too great an increase in viscosity.

The choice of suitable neutralizing agents is also determined by whether the neutralized or partly neutralized polyisocyanate ionomer is required to be stable in storage for an extended period or used immediately. In the latter case, neutralization may also be carried out with tertiary amines which still contain reactive groups such as —OH, —NHR, —CO or —NH$_2$. For preparing polyisocyanates which are required to be stable in storage, these groups should first be blocked by reacting them e.g. with monoisocyanates.

The inorganic and/or organic particulate and/or fibrous material should have a cross-section of 1 $\mu$ to 100 mm, preferably 0.01 mm to 20 mm. These measurements apply to the smallest cross-section of the material, for example a fibrous material may have a length of more than 100 mm.

Any suitable particulate and/or fibrous material may be used such as, for example, various solid inorganic or organic substances in the form of powder; granules; wire; fibers; dumbbell shaped particles; crystallites; spirals; rods; solid beads; hollow beads; plastic foam particles; non-woven webs; woven and knitted fabrics; tapes; pieces of foil, etc., for example, dolomite; chalk; clay; asbestos; basic silicic acids; sand; talcum; iron oxide; aluminum oxide and hydroxides; alkali metal silicates; zeolites; mixed silicates; calcium silicates; calcium sulphates; alumino-silicates; cements; basalt wool or powder; glass fibers; carbon fibers; graphite; carbon black; powdered aluminum; iron; copper; silver; molybdenum sulphide; steel wool; woven bronze or copper fabrics; silicon powder; expanded clay particles; hollow glass beads; glass powder; lava and pumice particles; sawdust; wood meal; cork; cotton; straw; popcorn; coke and particles of filled or unfilled, foamed or unfoamed, stretched or unstretched organic polymers. The following are a few examples among the many organic polymers which may be used e.g. as powders; granulates; foam particles; solid beads; hollow beads; foamable but not yet foamed particles; fibers; tapes; woven or non-woven webs, etc.: Polystyrene; polyethylene; polypropylene; polyacrylonitrile; polybutadiene; polyisoprene; polytetrafluoroethylene; aliphatic and aromatic polyesters; melamine urea resins or phenol resins; polyacetal resins; polyepoxides; polyhydantions; polyureas; polyethers; polyurethanes; polyimides; polyamides; polysulphones; polycarbonates and the like any copolymers of such polymers.

Particularly suitable materials are chalk; alumina; asbestos; sand; calcium silicates; cement; lime; calcium sulphates; alumino-silicates; stone wool or powder; coaldust; graphite; glass fibers; carbon fibers; expanded clay or expanded glass particles; lava and pumice particles; brick dust; brick chips; stone chips and granulated stone of all kinds; quartz sand; hollow metal silicate beads; gravel; wood shavings; sawdust; straw and cork as well as foamed particles or fibers of polystyrene; polyethylene; polypropylene; polyesters; melamine-urea or phenol resins; polyureas and polyurethanes.

Inorganic particulate materials which are particularly suitable for the purpose of the invention are hydraulic binders such as the hydraulic cements, synthetic anhydrite, gypsum or slaked lime.

Suitable hydraulic cements are in particular Portland quick-setting, blast furnace, low-calcined, sulphate-resistant, brick, natural, limestone, gypsum, puzzuola and calcium sulphate cements.

These materials are preferably used in combination with water.

Inorganic particulate materials such as sand, gravel and size-reduced or ground rock as well as soils such as clay or loam masses are also particularly suitable and therefore preferred.

The auxiliary substances or additives used are substances which are required to fulfill one or more of the following criteria:

a. They must have hydrogen atoms which are reactive with isocyanates and therefore contribute to the construction of a higher-molecular weight polyaddition product, b. they must influence the reaction between isocyanates on the one hand and hydrogen atoms which are reactive with isocyanates on the other but also the reaction of isocyanates with other isocyanate groups in order to control the course of the reactions as desired, and c. they are required to improve the workability or other properties of the end product such as their fire characteristics, mechanical strength, porosity, resistance to hydrolysis or also ability to be degraded or rot insofar as these are desirable criteria.

Substances of class a) used according to the invention, i.e. compounds which contain hydrogen atoms capable of reacting with isocyanates, are preferably water and low-molecular weight organic compounds which have molecular weights of up to about 400, e.g.

1. saturated and unsaturated glycols such as ethylene glycol or ethylene glycol condensates; butane-1,3-diol; butane-1,4-diol; butane-1,3-diol; propane-1,2-diol; propane-1,3-diol; neopentyl glycol; hexanediol; bis-hydroxymethylcyclohexane; dioxethoxy-hydroquinone; dioxethyldian; terephthalic acid-bis-glycol ester; succinic acid-di-$\beta$-hydroxy ethylamide; succinic acid-di-[N-methyl-($\beta$-hydroxyethyl)]-amide; 1,4-di-($\beta$-hydroxymethylmercapto)-2,3,5,6-tetrachlorobenzene or 2-methyl-propane-(1,3);

2. aliphatic, cycloaliphatic and aromatic diamines such as ethylene diamine; hexamethylene diamine; cyclohexylene-1,4-diamine; benzidine; diamino-diphenylmethane; dichloro-diamino-diphenylmethane; the isomers of phenylene diamine; hydrazine; ammonia; carbohydrazide; adipic acid dihydrazide; sebacic acid dihydrazide; piperazine; N-methyl-propylene diamine; diaminodiphenyl sulphone; diaminodiphenyl ether; diaminodiphenyl dimethylmethane and 2,4-diamino-6-phenyl-triazine;

3. amino alcohols such as ethanolamine; propanolamine; butanolamine; N-methyl-ethanolamine and N-methyl-isopropanolamine;

4. aliphatic, cycloaliphatic, aromatic and heterocyclic monoamino and diamino carboxylic acids such as glycine; $\alpha$- and $\beta$-alanine; 6-aminocaproic acid; 4-aminobutyric acid; the isomers of monoamino and diaminobenzoic acids and the isomers of monoamino and diaminonaphthoic acid.

Water is particularly preferred.

Organic compounds with a molecular weight of about 400 to about 10,000 which contain at least two hydrogen atoms capable of reacting with isocyanates and determinable by the Zerewitinoff method are also very suitable. These include not only compounds which contain amino, thiol or carboxyl groups but particularly also polyhydroxyl compounds, in particular compounds which contain 2 to 8 hydroxyl groups, especially those with a molecular weight of from about 800 to about 10,000, preferably about 1000 to about 6000, e.g. polyesters, polyethers, polythioethers, polyacetals, polycarbonates or polyester amides containing at least 2, generally 2 to 8 and preferably 2 to 4 hydroxyl groups of the kind which are known per se for the production of homogeneous and cellular polyurethanes.

Any suitable polyester with hydroxyl groups may be used such as e.g. reaction products of polyhydric alcohols, preferably dihydric alcohols to which trihydric alcohols may be added, and polybasic, preferably dibasic carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acids may be aliphatic, cycloaliphatic, aromatic and/or heterocyclic and may be substituted, e.g. with halogen atoms, and/or unsaturated. The following are examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid which may be mixed with monomeric fatty acids; dimethyl terephthalate, bis-glycol terephthalate and the like. Suitable polyhydric alcohols are e.g. ethylene glycol; propylene-1,2- and -1,3-glycol; butylene-1,4- and -2,3-glycol; hexane-1,6-diol; octane-1,8-diol, neopentyl glycol; cyclohexane dimethanol (1,4-bis-hydroxymethyl cyclohexane); 2-methyl-propane-1,3-diol; glycerol; trimethylolpropane; hexane-1,2,6-triol; butane-1,2,4 -triol; trimethylolethane; pentaerythritol; quinitol; mannitol; sorbitol; methyl glycoside; diethylene glycol; triethylene glycol; tetraethylene glycol; polyethylene glycols; dipropylene glycol; polypropylene glycols; dibutylene glycol; polybutylene glycols and the like. The polyesters may also contain a proportion of carboxyl end groups. Polyesters of lactones such as ε-caprolactone or hydroxycarboxylic acids such as ω-hydroxycaproic acid may also be used.

The hydroxyl polyethers used according to the invention, which contain at least two and generally two to eight, preferably two or three hydroxyl groups are also known per se and are obtained, for example, by polymerizing epoxides such as ethylene oxide, propylene oxide, butylene oxide, tetrahydrofuran, styrene oxide or epichlorohydrin, each with itself. e.g. in the presence of boron trifluoride, or by the addition of these epoxides, either as mixtures or successively, to starting components which contain reactive hydrogen atoms such as alcohols or amines, e.g. water; ethylene glycol; propylene-1,3- or -1,2-glycol; trimethylolpropane; 4,4'-dihydroxy-diphenylpropane; aniline; ammonia, ethanolamine, ethylene diamine or the like. Sucrose polyethers such as those described e.g. in German Auslegeschriften Pat. Nos. 1,176,358 and 1,064,938 may also be used according to the invention. It is frequently preferred to use polyethers which contain predominantly primary hydroxyl groups (up to 90 percent by weight, based on all the hydroxyl groups present in the polyether). Polyethers which are modified with vinyl polymers, e.g. the polyethers which can be obtained by polymerizing styrene or acrylonitrile in the presence of polyethers (U.S. Pat. Specifications Nos. 3,383,351; 3,304,273; 3,523,093 and 3,110,695 and German Pat. Specification No. 1,152,536) and polybutadienes which contain hydroxyl groups are also suitable.

Among the polythioethers there should be particularly mentioned the condensation products of thiodiglycol with itself and/or with other glycols, dicarboxylic acids, formaldehyde, aminocarboxylic acids or amino alcohols. The products obtained are polythio mixed ethers, polythioether esters or polythioether ester amides, depending on the co-components.

The polyacetals used may be e.g. the compounds which can be prepared from glycols such as diethylene glycol, triethylene glycol, 4,4'-dioxethoxy-diphenyl-dimethylmethane, hexanediol and formaldehyde. Polyacetals which are suitable for the process according to the invention may also be prepared by polymerizing cyclic acetals.

Suitable polycarbonates with hydroxyl groups include those known per se, e.g. those which can be prepared by reacting diols such as propane-1,3-diol, butane-1,4-diol and/or hexane-1,6-diol, diethylene glycol, triethylene glycol or tetraethylene glycol with diaryl carbonates such as diphenyl carbonate or phosgene.

Suitable polyester amides and polyamides include e.g. the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups and modified or unmodified natural polyols such as castor oil, carbohydrates or starch may also be used. Addition products of alkylene oxides with phenol-formaldehyde resins or with urea-formaldehyde resins may also be used according to the invention.

Representatives of these compounds to be used according to the invention have been described e.g. in High Polymers, Volume XVI, "Polyurethanes, Chemistry and Technology" by Saunders-Frisch, Interscience Publishers, New York, London, VOlume I, 1962, pages 32 – 42 and pages 44 – 54 and Volume II, 1964, pages 5 – 6 and 198 – 199 and in kunststoff-Handbuch, Volume VII, Vieweg-Höchtlen, Carl-Hanser-Verlag, Munich 1966, e.g. in pages 45 to 71.

Catalysts are often used in the process according to the invention to control the isocyanate reaction with hydrogen atoms capable of reacting with isocyanates and with other isocyanate groups. The catalysts used may be of the kind known per se. e.g. tertiary amines such as triethylamine; tributylamine; N-methyl-morpholine; N-ethyl-morpholine; N-cocomorpholine; N,N,N',N'-tetramethyl-ethylene diamine; 1,4-diazabicyclo-(2,2,2)-octane; N-methyl-N'-dimethylaminoethyl-piperazine; N,N-dimethyl benzylamine; bis-(N,N-diethylaminoethyl)-adipate; N,N-diethyl benzylamine; pentamethyl-diethylene triamine; N,N-dimethyl cyclohexylamine; N,N,N',N'-tetramethylbutane-1,3-diamine; N,N-dimethyl-β-phenyl ethylamine; 1,2-dimethyl imidazole, 2-methyl imidazole and the like.

Suitable tertiary amine catalysts containing hydrogen atoms which are reactive with isocyanate groups are e.g. triethanolamine; triisopropanolamine; N-methyl-diethanolamine; N-ethyl-diethanolamine; N,N- dimethyl ethanolamine and their reaction products with alkylene oxides such as propylene oxide and/or ethylene oxide.

The catalysts used may also be silaamines which contain carbon-silicon bonds as described e.g. in German Pat. Specification No. 1,229,290, e.g. 2,2,4-trimethyl-2-silamorpholine or 1,3-diethylaminomethyl-tetramethyl-disiloxane.

Bases which contain nitrogen such as tetraalkyl ammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention, particularly organic tin compounds.

The organic tin compounds used are preferably tin-(II)-salts of carboxylic acids such as tin(II)-acetate; tin(II)-octoate; tin(II)-ethyl hexoate and tin(II)-laurate and the dialkyl tin salts of carboxylic acids such as dibutyl tin diacetate, dibutyl tin dilaurate, dibutyl tin maleate or dioctyl tin diacetate.

Other representatives of catalysts which may be used according to the invention and the mode of action of the catalysts are described in Kunststoff-Handbuch, Volume VII, published by Vieweg and Höchtlen, Carl-Hanser-Verlag, Munich 1966, e.g. on pages 96 to 102.

The catalyst may be used in any catalytic amount, preferably in a quantity of between about 0.001 and about 10 percent by weight, based on the quantity of polyisocyanate in the reaction mixture.

Suitable catalysts for catalyzing the reaction of the isocyanate groups with each other to promote, for example, the formation of uretdione, isocyanurate or carbodiimide groups include, for example, phospholine oxide, potassium acetate, hexahydrotriazine derivatives and pyridine derivatives. Any catalytic amount of these catalysts may be used preferably in a quantity of between about 0.001 and about 10 percent by weight, based on the quantity of polyisocyanate.

The following are examples of substances which may be included according to the invention to improve the workability or properties of the end product:

1. Readily volatile organic substances used as blowing agents. Suitable organic blowing agents are e.g. acetone; ethyl acetate; methanol; ethanol; halogenated alkanes such as methylene chloride; chloroform; ethylidene chloride; vinylidene chloride; monofluorotrichloromethane; chlorodifluoromethane or dichlorodifluoromethane; butane; hexane; heptane or diethyl ether. Compounds which decompse at temperatures above room temperature with liberation of gases such as nitrogen, e.g. azo compounds such as azoisobutyric acid nitrile, may also act as blowing agents. Other examples of blowing agents and details of the use of blowing agents may be found in Kunststoff-Handbuch, Volume VII, published by Vieweg and Höchtlen, Carl-Hanser-Verlag, Munich 1966, e.g. on pages 108 and 109, 453 to 455 and 507 to 510.

2. Surface-active additives. Suitable emulsifiers are e.g. the sodium salts of rieinoleic sulphonates or of fatty acids or salts of fatty acids with amines such as oleic acid diethylamine or stearic acid diethanolamine. Alkali metal or ammonium salts of sulphonic acids such as dodecyl benzene sulphonic acid or dinaphthylmethane disulphonic acid or of fatty acids such as ricinoleic acid or of polymeric fatty acids may also be used as surface-active additives.

3. Reaction retarders, e.g. substances which are acid in reaction such as hydrochloric acid or organic acid halides, or cell regulators known per se such as paraffins or fatty alcohols or dimethyl polysiloxanes; pigments or dyes and flame-retarding agents known per se, e.g. trischloroethyl phosphate or ammonium phosphate and polyphosphate; stabilizers against ageing and weathering; plasticizers; fungistatic and bacteriostatic substances and fillers such as barium sulphate, kieselguhr, carbon black or whiting.

Other examples of surface-active additives and reaction retarders, flame-retarding substances, plasticizers, dyes and fillers and fungistatic and bacteriostatic substances which may be included in the process according to the invention and the use and mode of action of these additives are described in Kunststoff-Handbuch, Volume VI, published by Vieweg and Höchtlen, Carl-Hanser-Verlag, Munich 1966, e.g. on pages 103 to 113.

4. Organic solvents. These are used particularly if highly viscous or solid polyisocyanates which contain ionic groups are required to be diluted to a workable viscosity or simply in order to increase the quantity, especially if only low concentrations of binder are required. For the last mentioned requirement, aqueous emulsions of the isocyanates according to the invention may also be used, in which case water may function both as the reactant and to make the binder more finely divided.

Solvents need not be used according to the invention because the isocyanates can form finely divided emulsions in aqueous systems even without solvents or other additives by virtue of their ionic groups.

The production of the composite materials may be carried out, for example, by mixing the above described components either in one stage or in several stages in an intermittently or continuously operating mixing apparatus and then leaving the resulting mixture to react, in most cases outside the mixing apparatus in molds or on suitable substrates. If only small quantities of the polyisocyanate with ionic groups are used as binder, based on the quantity of inorganic and/or organic particulate and/or fibrous material which is required to be bonded, it is often advantageous to use a procedure in which the binder components are sprayed, scattered, spread-coated or rolled on to the particulate and/or fibrous material and the component mixture is then hardened after the shaping process, optionally at an elevated temperature.

The processing temperatures used may be between 0°C and 300°C but are preferably between 5°C and 150°C. According to one preferred procedure, the components are combined at room temperature and then bonded at room temperature or elevated temperature, optionally under pressure. If desired, the mixture of components may also be pressed, cast or injected into cold or heated molds, which may be relief molds or solid or hollow molds, and left to harden in these molds at room temperature or temperatures up to 200°C, optionally under pressure, optionally employing a centrifugal casting method.

Reinforcing materials such as inorganic and/or organic or metal wires; fibers; non-woven webs; foams; woven structures, etc. may easily be used if desired. The incorporation of these reinforcing materials may be achieved, for example, by the fiber mat impregnation process or by processes in which the reaction mixtures and reinforcing fibers are together applied to the mold, for example, by means of a spray device. The molded products obtainable in this way may be used as structural elements, e.g. as such or as foamed or unfoamed sandwich elements obtained by subsequently laminating the products with metal, glass, plastics, etc. They may also be used as hollow bodies, e.g. as containers for goods which are required to be kept moist or cool, or as filter materials or exchangers, as catalyst carriers or carriers of other active substances, as decorative elements, furniture parts and cavity fillings. They may also be used as heavy-duty lubricants and coolants or carriers of such substances, e.g. in metal extrusion presses. The products may also be used in the field of model building and mold building and for the construction of molds for metal casting.

The polyisocyanate component may, of course, be diluted with solvents which are inert towards isocyanates if such dilution appears necessary to reduce the viscosity or to improve distribution, especially if a spray technique is to be employed.

Premixes of the polyisocyanates used according to the invention with water or other compounds containing hydrogen atoms which are reactive with isocyanates are particularly interesting because a reactant required for the isocyanate to synthesize a higher-molecular weight product then forms part of the binder component.

One disadvantage of such premixes is that they remain workable for only a limited time since they have pot lives of only a few minutes to a few days; in most cases they have the viscosity necessary for processing for only a few hours. However, this limitation does not apply if masked or encapsulated polyisocyanates are used in these premixes. The proportion by weight of binder to substrate may vary within wide limits and depends primarily on the properties which are required in the composite material which is to be produced.

According to the invention, composite materials may be produced in which the proportion by weight of ionically modified polyisocyanate to particulate or fibrous material is between 1:99 and 90:10 and preferably between 3:97 and 80:20.

If the materials which are to be bonded have a low specific gravity, for example, below 0.1 g/cm$^3$, the proportion by weight of binder will, of course, be high. In such composite materials, the proportion by weight of polyisocyanate to the material which is required to be bonded will more suitably be within the range of 30:70 to 80:20.

If, on the other hand, specifically heavy materials with densities above 1 g/cm$^3$ are used, the proportion by weight of polyisocyanate to the material which is to be bonded is preferably between 20:80 and 3:97.

The auxiliary substances and additives are generally used in quantities of 0–50 percent by weight, preferably 0–20 percent, based on the sum of binder and substrate.

A wide variety of composite materials may be obtained depending on the combination and proportions of the components, for example, the products may be porous; compact, soft; hard; elastic; brittle; flexible; combustile; non-combustible; compression-resistant; hgigh tensile strength; tough; fire-retarding; capable of hydrolysis; water-resistant; chemically resistant; plastic or thermoplastic; heat-insulating or sound-insulating.

If the inorganic properties such as non-inflammability and high mechanical strength are required to predominate in the composite materials obtained, it is advisable to use inorganic particulate and/or fibrous materials and only a low proportion of polyisocyanates with ionic groups as binder, preferably less than 20 percent by weight based on the inorganic solids content, and it may also be advisable to add water.

If, on the other hand, the organic properties are required to predominate, such as flexibility, plasticity or thermoplasticity, it is advisable either to use organic particulate and/or fibrous materials or, when using inorganic materials, to increase the sum of proportions of the polyisocyanate with ionic groups used as binder and any organic additives to more than 50 percent by weight, based on the inorganic material. If the polyisocyanates containing ionic groups are used in combination with inorganic particulate materials used in the building industry and, optionally, water, the mixtures may be used in underground and surface engineering and road building for erecting walls, sealing surfaces and grounting joints, for plastering, priming, insulating and decorating and as a coating, flooring composition and lining material. The products may also be used as adhesives or mortar or casting compounds.

When used for filling cavities, joints and cracks, the component mixture provides a very firm bond between the materials which are to be joined. Insulating indoor plasters can also be produced simply by spraying the mixtures.

If, for example, wood chips, expanded clay particles, lava or pumice particles, cork, rubber waste or the usual plastics waste are used as particulate components, the mixtures may also be used to produce formed products or panels or blocks which can then be worked up into other shapes, for example by sawing, cutting, drilling, planing, polishing or other chip-removing processes.

The molded products may be further modified in their properties by thermal after-treatment, oxidation processes, hot-pressing, sintering processes or surface-melting or other compacting processes.

The materials used for the molds may be inorganic and/or organic foamed or unfoamed materials such as metals, e.g. iron, nickel, refined steel, aluminum which has been lacquered or treated in some other way, e.g. coated with Teflon, porcelain, glass, gypsum, cement, wood or plastics such as polyvinyl chloride, polyethylene, epoxide resins, polyurethanes, acrylonitrile-butadiene-styrene, rubber, polycarbonate, etc.

Particularly interesting are combinations of the polyisocyanate which contains ionic groups with hydraulic binders and mineral aggregates to which light-weight porous materials may be added. Composite materials which are particularly suitable for use in the building industry, for example, as flooring compositions; concretes, light-weight concretes, plasters, mortar and grouting compositions are obtained in this way.

The special feature of the materials according to the invention is that the hardening times as well as the other characteristics such as the onset of setting and final setting, elasticity, chemical resistance and resistance to hydrolysis can be influenced as desired by the nature and quantity of modified polyisocyanate.

These compositions are very useful because they set rapidly once the components have been mixed. They can therefore be used to produce new flooring and wall surfaces which are ready for use soon after they have been applied.

Inorganic-organic foams which are obtained from hydraulic binders such as cement, lime, anhydrite or gypsum and isocyanates which contain ionic groups and water in the presence of blowing agents are also particularly interesting. Products obtained from an aqueous calcium hydroxide suspension (milk of lime) with ionically modified isocyanates are particularly preferred. The conversion of calcium hydroxide into calcium carbonate which takes place in the reaction between the components obviously provides an exceptionally firm bond. The products obtained may be flexable, elastic or hard, depending upon the isocyanate used, and their density may, for example, be between 12 and 1000 kg/m³. Hard foams with densities of from 40 to 600 kg/m³ are particularly preferred and may be used as compression-resistant constructional and insulating materials, especially in the building industry. For the production of these materials, it is particularly preferred to employ a proportion by weight of polyisocyanate to hydraulic, particulate material of between 10:90 and 70:30.

This method is suitable, for example, for the industrial manufacture of building elements by intermittent or continuous processes but since no external heat supply is necessary it can easily be carried out on the building site.

The products obtainable by the process according to the invention combine the advantages of inorganic and organic materials, for example, they are compression-resistant, capable of taking static loads and simple to produce and have excellent resistance to fire.

EXAMPLES

Preparation of 1: polyisocyanates which contain ionic groups

POLYISOCYANATE A 1

1000 g of a crude phosgenation product of an aniline/formaldehyde condensate from which sufficient dinuclear component had been distilled off to leave a distillation residue with a viscosity of 400 cP at 25°C were gasified with sulphur trioxide at 100° to 110°C. 98 g of sulphur trioxide (9.8%, based on the isocyanate) were absorbed in 18 hours. The starting material used for sulphonation had been obtained by phosgenating crude diamino diphenyl methane which had the following composition:

45,1 % dinuclear portion
22,3 % trinuclear portion
32,6 % higher nuclear portion
NCO-content 31,0 %

The product was poured out at 140°C and solidified to a brittle resin when cold. From the sulphur content of 3.3%, the theoretical $SO_H$ group content was calculated to be 8.2%. The resin could be pulverized in a mortar.

POLYISOCYANATE A 2:

A similar phosgenation product which had a viscosity of 2000 cP at 25°C was sulphonated with 92 g of sulphur trioxide at 100° to 140°C. The thick liquid reaction mixture solidified to a brittle resin at room temperature. From the sulphur content of 2.6%, the theoretical $SO_3H$ group content was calculated to be 6.5%. The starting material used for sulphonation had been obtained by phosgenating crude diamino diphenyl methane which had the following composition:

40,1 % dinuclear portion
33,3 % trinuclear portion
9,0 % tetranuclear portion
18,6 %. higher nuclear portion
NCO-content 30,1 %.

POLYISOCYANATE A 3:

5000 g of a commercial mixture of diisocyanatodiphenylmethane isomers which had a viscosity of 22.6 cP at 25°C and an isocyanate content of 30% was gasified with a stream of sulphur trioxide/nitrogen at room temperature until the sulphur content was found to be 1.24% S. The quantity of $SO_3$ used was 170 g (3.4%).

The liquid product was filtered from small quantities of solid residue and found to be stable for several weeks. The viscosity was 108 cP/25°C.

The starting material used for sulphonation had been obtained by phosgenating a mixture of diaminodiphenylmethane isomers which had the following composition; 13.6% of 2,2'-isomer, 57.0% of 2,4'-isomer and 22.6% of 4,4'-isomer.

POLYISOCYANATE A 4:

5000 g of a commercial mixture of diisocyanatodiphenylmethane isomers which had a viscosity of 18.5 cP at 25°C and an isocyanate content of 31% was gasified with a stream of sulphur trioxide/nitrogen at room temperature until the sulphur content was found to be 3.05% S. The quantity of $SO_3$ used was 436 g (8.7%).

The liquid product was separated from small quantities of solid residue and found to be stable for several weeks. The viscosity was 816 cP/25°C.

The starting material used for sulphonation had been obtained by phosgenating a mixture of diaminodiphenylmethane isomers which had the following composition: 7.0% of 2,2'-isomer, 53.6% of 2,4'-isomer and 35.0% of 4,4'-isomer.

POLYISOCYANATE A 5:

37.55 kg of a crude phosgenation product of an aniline/formaldehyde condensate from which sufficient dinuclear constituent had been distilled off to leave a distillation residue with a viscosity of 400 cP at 25°C and an isocyanate content of 30.3% by weight, a dinuclear content of 45.1% by weight, a trinuclear content of 22.3% by weight and a higher-nuclear polyisocyanate content of 32.6% by weight were gasified for 15 hours with a mixture of 1160 g of sulphur trioxide and 1.6 m³ of nitrogen at 50°C.

From the sulphur content of 0.99%, the theoretical $SO_3H$-group content was calculated to be 2.5%. The product had a viscosity of 4163 cP at 25°C. Polyisocyanate A 5. Potentiographic titration carried out after reaction of the isocyanate groups with methanol indicated a total consumption of 1 N sodium hydroxide solution of 39.7 ml per 100 g of polyisocyanate A 5.

The isocyanate content of the product found after correction for the acid groups was 29.1% by weight.

POLYISOCYANATES A6 – A 21:

The following polyisocyanates were used as starting materials for preparing the polyisocyanates A 6 – A 15 containing carboxyl groups which are described hereinafter:

V 1 Diisocyanato-diphenylmethane was distilled from the crude phosgenation product of an aniline/formaldehyde condensate until the distillation residue had a viscosity of 100 cP at 25°C (dinuclear content 59.7% by weight, trinuclear content 21.3% by weight, higher nuclear polyisocyanate content 19.0% by weight). NCO-content: 31,4 %

V 2 Similarly prepared polyisocyanate with a viscosity of 200 cP at 25°C (dinuclear content 44.3% by weight, trinuclear content 23.5% by weight, higher nuclear polyisocyanate content 32.2% by weight). NCO-content: 31,4 %

V 3 Similarly prepared polyisocyanate with a viscosity of 400 cP at 25°C (dinuclear content 45.1% by weight, trinuclear content 22.3% by weight, higher nuclear polyisocyanate content 32.6% by weight). NCO-content: 31,0 %

V 4 Similarly prepared polyisocyanate with a viscosity of 500 cP at 25°C (dinuclear content 40.6% by weight, trinuclear content 27.2% by weight, higher nuclear polyisocyanate content 32.2% by weight). NCO-content: 30,5 %

V 5 Similarly prepared polyisocyanate with a viscosity of 1700 cP at 25°C (dinuclear content 40.3% by weight, trinuclear content 34.0% by weight, higher nuclear polyisocyanate content 25.7% by weight). NCO-content: 30,1 %.

GENERAL METHOD OF PREPARATION:

The aromatic polyisocyanate was introduced into the reaction vessel and the hydroxy carboxylic acid was added slowly at the given temperature. The mixture was then stirred and filtered if necessary and any solvent present was distilled off under reduced pressure.

POLYISOCYANATE A 22:

39 g of hydroxy carboxylic acid E (OHN = 260, SN = 120) were intimately mixed with 8.3 g of tri-n-butylamine. 50% of the theoretical quantity of all the carboxyl groups present were converted into carboxylate groups by mild heating. The liquid product, which had become only slightly more viscous, was then mixed with 681 g of polyisocyanate V 2 and the mixture was kept at 80°C for 1.5 hours with stirring. After filtration to remove traces of sediment, a liquid polyisocyanate containing carboxyl groups and carboxylate groups was obtained which was characterized by the following data:

isocyanate content: 26.4% by weight $n_{22}$: 2650 cP

Carboxyl group content (calculated): 0.27% by weight

Carboxylate group content (calculated): 0.27% by weight

Polyisocyanates A 23 – A 31:

General method of preparation

The procedure was divided into two stages:
1. Reaction of the polyisocyanate with an organic compound which, in addition to containing a tertiary nitrogen atom, still contained hydrogen atoms which were reactive with isocyanates;
2. (partial) quaternization of the reaction product with diethyl sulphate.

Starting materials for the polyisocyanates A 6 – A 21 which are to be used according to the invention
Hydroxy carboxylic acids prepared from (molar ratio 1 : 1) in 1–3 hours/105–125°C

| | | OHN | SN |
|---|---|---|---|
| A | 1,1,1-trimethylolpropane/tetrahydrophthalic acid anhydride | 400 | 209 |
| B | 1,1,1-trimethylolpropane/tetrahydrophthalic acid anhydride* | 328 | 227 |
| C | 1,1,1-trimethylolpropane.3EOX/phthalic acid anhydride | 258 | 116 |
| D | 1,1,1-trimethylolpropane/maleic acid anhydride | 392 | 133 |
| E | 1,1,1-trimethylolpropane.3EOX/tetrahydrophthalic acid anhydride | 260 | 120 |
| F | 1,1,1-trimethylolpropane/hexahydrophthalic acid anhydride | 372 | 188 |
| G | 1,1,1-trimethylolpropane.3EOX/glutaric acid anhydride | 249 | 114 |
| H | 1,1,1-trimethylolpropane.3EOX/trimellitic acid anhydride | 192 | 173 |
| I | 1,1,1-trimethylolpropane.3EOX/maleic acid anhydride | 278 | 129 |
| K | Glycerol/maleic acid anhydride | 453 | 231 |
| L | 1,1,1-trimethylolpropane/phthalic acid anhydride | 372 | 189 |

*molar ratio 1 : 1.2
OHN OH-number
EOX ethylene oxide
SN acid number

OPERATION 1

A weighed quantity of N-methyl-diethanolamine or N-methyl-bis-oxypropylamine or N-butyl-diethanola- Preparation of the polyisocyanates to be used according to the invention (2 hours/100°C)

| Example | Polyisocyanate g | type | Hydroxy carboxylic acid g | type | —COO$^{(-)}$ groups % by weight | NCO % by weight | Viscosity cP (25°C) |
|---|---|---|---|---|---|---|---|
| A 6 | 1182 | V 1 | 18 | E | 0.15 | 29.1 | 160 |
| A 7 | 1182 | V 2 | 18 | E | 0.15 | 30.2 | 320 |
| A 8 | 1182 | V 3 | 18 | E | 0.15 | 30.2 | 570 |
| A 9 | 1182 | V 4 | 18 | E | 0.15 | 29.6 | 940 |
| A 10 | 1182 | V 5 | 18 | E | 0.15 | 29.2 | 1500 |
| A 11 | 1182 | V 3 | 18 | A | 0.16 | 29.4 | 680 |
| A 12 | 1182 | V 3 | 18 | B | 0.13 | 29.7 | 680 |
| A 13 | 1182 | V 3 | 18 | C | 0.10 | 30.0 | 550 |
| A 14 | 1182 | V 3 | 18 | L | 0.15 | 29.8 | 580 |
| A 15 | 900 | V 2 | 100 | I | 1.1 | 24.4 | 50,000 |
| A 16 | 900 | V 3 | 100 | E | 1.0 | 24.8 | 50,000 |
| A 17 | 900 | V 5 | 100 | I | 1.1 | 23.2 | 50,000 |
| A 18 | 800 | V 2 | 200 | D | 3.1 | 18.6 | thick liquid |
| A 19 | 800 | V 2 | 200 | F | 2.0 | 20.8 | thick liquid |
| A 20 | 800 | V 2 | 200 | H | 1.6 | 21.2 | thick liquid |
| A 21 | 800 | V 2 | 200 | K | 3.5 | 18.2 | | mine was added dropwise within 30 minutes to a specified quantity of polyisocyanate V 3 at room temperature in a 2-liter three-necked flask with stirring. The exothermic reaction was regulated by external cooling by means of a water bath so that the temperature of the reaction mixture was kept below 30°C. Stirring was continued for one hour more at room temperature after all the amine had been added and the viscosity of the product at 25°C, the isocyanate content in percent by weight and the tertiary nitrogen content in percent by weight were determined.

OPERATION 2

A weighed quantity of dimethyl sulphate was added dropwise with vigorous stirring at room temperature over a period of 30 minutes to a portion of the polyisocyanate prepolymer obtained by operation 1 which contained tertiary nitrogen and stirring was then continued for 30 minutes after all the dimethyl sulphate had been added. Polyisocyanates A 23 – A 31 were obtained in this way, the reaction being accompanied by an increase in viscosity and heating.

| | -continued | |
|---|---|---|
| Compression strength: | | 142 kp/cm² |
| Flexural strength: | | 29.6 kp/cm² |

EXAMPLES 2–50:

The following examples are summarized in the tables. The compositions were prepared as described in Example 1 and the quantities given are parts by weight. The abbreviations have the following meanings:

$t_M$ = mixing time of whole mixture $t_V$ = setting time measured from the time when the mixture was first spread out to the time when it began to set $t_E$ = time until the mixture could be removed from the mold, measured from the time when it was first introduced into the mold to the moment when it could be removed in such a condition that the contours were preserved intact $t_B$ = time until the composition was in a suitable condition for walking on, measured from the time when it was spread-coated (thickness of layer 20

Polyisocyanates A 23 – A 31

| Polyisocyanate | Polyisocyanate V 3 (g) | N-methyl-diethanol-amine (g) | N-methyl-N-butyl-diethanol-amine (g) | bis-oxy-propyl-amine (g) | NCO-content in % by weight |
|---|---|---|---|---|---|
| A 23 | 500 | 20 | — | — | 26.3 |
| A 24 | 500 | 10 | — | — | 27.8 |
| A 25 | 500 | 5 | — | — | 28.5 |
| A 26 | 500 | — | 20 | — | 26.3 |
| A 27 | 500 | — | 10 | — | 28.7 |
| A 28 | 500 | — | 5 | — | 29.8 |
| A 29 | 500 | — | — | 20 | 27.4 |
| A 30 | 500 | — | — | 10 | 28.5 |
| A 31 | 500 | — | — | 5 | 29.3 |

| | tert.-N-content in % by weight | Viscosity in cP/25°C | Amount used in quaternization (g) | Dimethyl-sulphate (g) |
|---|---|---|---|---|
| A 23 | 0.41 | 4100 | 250 | 8 |
| A 24 | 0.33 | 1600 | 250 | 4 |
| A 25 | 0.18 | 800 | 250 | 2 |
| A 26 | 0.36 | 2000 | 250 | 8 |
| A 27 | 0.17 | 700 | 250 | 4 |
| A 28 | 0.14 | 450 | 250 | 2 |
| A 29 | 0.33 | 1800 | 250 | 8 |
| A 30 | 0.24 | 1200 | 250 | 4 |
| A 31 | 0.17 | 420 | 250 | 2 |

EXAMPLE 1

51 parts by weight of polyisocyanate A 5 were added to a mixture of 70 parts by weight of cement (PZ 350 F according to DIN 1164), 440 parts by weight of building sand (washed Rhine sand, 0–3 mm) and 100 parts by weight of water, and the whole mixture was then vigorously mixed for 3 minutes. A portion of the mixture was filled into a mold measuring 4 cm × 4 cm × 16 cm to produce samples for mechanical tests. Another portion of the mixture was spread out to form a layer 20 mm in thickness. The mixture began to solidify after 5 minutes and the portion in the mold could be removed after 10 minutes with the mold contours intact, and the spread-coated mixture could be walked on after 3 hours. The composite material obtained was a polyurea concrete which contained ionic groups; it had the following properties after 6 months:

| Gross density: | 1.97 g/cm³ |
|---|---| mm) until it could be walked on.

The tests were carried out on the samples measuring 4 cm × 4 cm × 16 cm after 6 months' storage at room temperature.

The composite materials obtained are to be regarded as polyurea- or polyurea-polyurethane-concretes which contain ionic groups and they may have a completely solid or a porous structure, depending on the formulations.

Legend to the abbreviations used in Table 1:
Cement:
Z1: Portland cement, PZ 350 F
Z2: quick-setting cement, alumina cement (Fondu Lafarge)

ADDITIVES:

A. POLYOLS:

P1: glycerol

P2: polyether which contains hydroxyl groups and which is based on trimethylolpropane, 1,2-propylene glycol, ethylene oxide and propylene oxide (ratio: 1:9), with an average functionality of 2.78 and an average molecular weight of 3200

P3: polyether which contains hydroxyl groups, synthesized on the same basis as P2 and having an average functionality of 2.78 and an average molecular weight of 3700 Ratio ethylene oxide/propylene oxide 1:4.

P4: polyethylene oxide monoalcohol started on n-butanol and having an average molecular weight of 1145

B. CEMENT LIQUIDIZER

H1: ketone-formaldehyde condensate with a molecular weight of 6000 which has been modified with sulphonic acid groups H2: water-soluble melamine formaldehyde condensate modified with sulphonic acid groups, Melment (Suddeutsche Kalkstickstoffwerke)

sand:
S1: building sand, washed Rhine sand 0–3 mm.

TABLE 1:

| Example No. | Cement Type | Cement Parts by weight | Sand Type | Sand Parts by weight | Water parts by weight | Type | Parts by weight | Polyisocyanate Type | Additive Parts by weight | Type | Parts by weight | Consistency remarks |
|---|---|---|---|---|---|---|---|---|---|---|---|---|
| 2 | Z 1 | 70 | S 1 | 440 | 100 | A 3 | 51 | — | — | — | — | can be spread coated with trowel |
| 3 | Z 1 | 70 | S 1 | 440 | 100 | A 4 | 51 | — | — | — | — | can be spread coated with trowel |
| 4 | Z 1 | 70 | S 1 | 440 | 30 | A 5 | 25.5 | — | — | — | — | can be tamped |
| 5 | Z 1 | 70 | S 1 | 440 | — | A 6 | 51 | — | — | — | — | can be tamped |
| 6 | Z 1 | 70 | S 1 | 440 | — | A 5 | 51 | — | — | — | — | can be tamped |
| 7 | Z 1 | 70 | S 1 | 440 | 30 | A 5 | 51 | P 1 | 9 | — | — | can be tamped |
| 8 | Z 1 | 70 | S 1 | 440 | 30 | A 5 | 51 | P 1 | 7.6 | — | — | can be tamped |
| 9 | Z 1 | 70 | S 1 | 440 | 30 | A 5 | 51 | P 1 | 6.1 | — | — | can be tamped |
| 10 | Z 1 | 70 | S 1 | 440 | 30 | A 5 | 51 | P 1 | 5 | — | — | can be tamped |
| 11 | Z 1 | 300 | S 1 | 300 | 100 | A 5 | 120 | P 1 | 10 | — | — | can be tamped |
| 12 | Z 1 | 300 | S 1 | 200 | 100 | A15 | 96 | P 1 | 30 | — | — | poor miscibility |
| 13 | Z 1 | 300 | S 1 | 300 | 60 | A 7 | 10 | P 1 | 30 | P 2 | 96 | easily spread coated |
| 14 | Z 1 | 300 | S 1 | 300 | 100 | A 5 | 96 | P 3 | 30 | — | — | can be spread coated with trowel |
| 15 | Z 1 | 300 | S 1 | 300 | 100 | A 5 | 96 | P 2 | 30 | — | — | " |
| 16 | Z 1 | 300 | S 1 | 300 | 100 | A10 | 96 | P 3 | 30 | — | — | " |
| 17 | Z 1 | 300 | S 1 | 300 | 100 | A16 | 63 | P 3 | 30 | — | — | " |
| 18 | Z 1 | 300 | S 1 | 300 | 100 | A17 | 63 | P 2 | 30 | — | — | " |
| 19 | Z 1 | 300 | S 1 | 300 | 100 | A 5 | 31 | P 3 | 30 | — | — | " |
| 20 | Z 1 | 300 | S 1 | 300 | 100 | A 5 | 31 | P 2 | 30 | — | — | " |
| 21 | Z 1 | 300 | S 1 | 300 | 120 | A13 | 63 | P 2 | 30 | — | — | thick liquid |
| 22 | Z 1 | 300 | S 1 | 300 | 100 | A 3 | 63 | P 2 | 30 | — | — | thick liquid |
| 23 | Z 1 | 300 | S 1 | 300 | 120 | A 9 | 63 | P 3 | 30 | — | — | thick liquid |
| 24 | Z 1 | 300 | S 1 | 300 | 120 | A 6 | 63 | P 2 | 30 | P 4 | 6 | pourable |
| 25 | Z 1 | 300 | S 1 | 300 | 120 | A 6 | 32 | P 2 | 30 | P 4 | 6 | pourable |
| 26 | Z 1 | 300 | S 1 | 300 | 120 | A 6 | 6 | P 2 | 30 | P 4 | 6 | " |
| 27 | Z 1 | 300 | S 1 | 300 | 120 | A 7 | 63 | — | — | — | — | " |
| 28 | Z 1 | 300 | S 1 | 300 | 120 | A 7 | 32 | — | — | — | — | " |
| 29 | Z 1 | 300 | S 1 | 300 | 120 | A 7 | 6 | — | — | — | — | " |
| 30 | Z 1 | 300 | S 1 | 300 | 120 | A 8 | 63 | P 2 | 30 | P 4 | 6 | " |
| 31 | Z 1 | 300 | S 1 | 300 | 120 | A12 | 31 | P 2 | 30 | P 4 | 6 | " |
| 32 | Z 1 | 300 | S 1 | 300 | 120 | A13 | 6 | P 2 | 30 | P 4 | 1 | " |
| 33 | Z 1 | 300 | S 1 | 300 | 120 | A14 | 63 | P 2 | 30 | P 4 | 3 | " |
| 34 | Z 1 | 300 | S 1 | 300 | 100 | A 5 | 60 | — | — | H 1 | 6 | can be tamped |
| 35 | Z 1 | 300 | S 1 | 300 | 100 | A 5 | 60 | — | — | H 2 | 3 | " |
| 36 | Z 1 | 300 | S 1 | 300 | 100 | A 5 | 60 | — | — | H 2 | 6 | " |
| 37 | Z 1 | 300 | S 1 | 300 | 100 | A 5 | 60 | — | — | H 1 | 3 | " |
| 38 | Z 1 | 300 | S 1 | 300 | 100 | A 5 | 60 | — | — | H 1 | 30 | pourable |
| 39 | Z 1 | 70 | S 1 | 440 | 100 | — | — | — | — | — | — | pourable |
| 40 | Z 1 | 70 | S 1 | 440 | 100 | A 5 | 51 | — | — | H 2 | 1 | pourable |
| 41 | Z 2 | 70 | S 1 | 440 | 100 | A17 | 51 | — | — | H 2 | 1 | pourable |
| 42 | Z 2 | 70 | S 1 | 440 | 100 | A22 | 51 | — | — | — | — | can be spread coated with trowel |
| 43 | Z 2 | 70 | S 1 | 440 | 100 | A25 | 51 | — | — | H 2 | 1 | pourable |
| 44 | Z 2 | 70 | S 1 | 440 | 100 | A28 | 51 | — | — | — | — | " |
| 45 | Z 2 | 300 | S 1 | 300 | 100 | A24 | 60 | P 2 | 30 | foams up | | can be spread coated with trowel |
| 46 | Z 2 | 300 | S 1 | 300 | 100 | A27 | 60 | — | — | — | — | pourable, |
| 47 | Z 2 | 300 | S 1 | 300 | 100 | A31 | 60 | P 2 | 30 | P 4 | 3 | foams up |
| 48 | Z 2 | 300 | S 1 | 300 | 100 | A28 | 60 | P 3 | 30 | P 4 | 3 | " |
| 49 | Z 2 | 300 | S 1 | 300 | 100 | A30 | 60 | P 2 | 10 | — | — | easily spread coated |
| 50 | Z 2 | 300 | S 1 | 300 | 100 | A30 | 60 | P 3 | 5 | — | — | " |
| blank value | Z 1 | 70 | S 1 | 440 | 100 | — | — | — | — | — | — | " |
| blank value | Z 1 | 300 | S 1 | 300 | 100 | — | — | — | — | — | — | " |

Examples 2–50

| Example No. | $t_M$ min. | $t_F$ | $t_E$ | $t_B$ | Structure | after 6 months at room temperature gross density g/cm³ | compression strength kp/cm² | flexural strength kp/cm² |
|---|---|---|---|---|---|---|---|---|
| 2 | 3 | 5 min. | 15 min. | 3 hours | compact | 2.12 | 295 | 69.2 |

TABLE 1:-continued

Examples 2–50

| | | | | | | | | |
|---|---|---|---|---|---|---|---|---|
| 3 | 3 | 4 min. | 10 min. | 2 hours | " | 2.11 | 330 | 87.2 |
| 4 | 3 | 10 min. | 20 min. | 4 hours | " | 1.98 | 140 | 32.4 |
| 5 | 3 | 24 hrs. | 48 hrs. | 7 days | " | 2.11 | 355 | 195.6 |
| 6 | 3 | 14 hrs. | 32 hrs. | 5 days | " | 2.03 | 437 | 77.8 |
| 7 | 3 | 3 min. | 5 min. | 1 hour | " | 2.09 | 465 | 84.0 |
| 8 | 3 | 5 min. | 8 min. | 1 hour | " | 2.10 | 473 | 16.4 |
| 9 | 3 | 5 min. | 10 min. | 1.5 hr | " | 2.14 | 497 | 90.2 |
| 10 | 3 | 5 min. | 15 min. | 2 hours | " | 1.98 | 295 | 54.0 |
| 11 | 3 | 45 min. | 1 hr. | 2 hours | " | 1.87 | 553 | 112.6 |
| 12 | 3 | 30 min. | 50 min. | 2 hours | " | 1.88 | 333 | 70.4 |
| 13 | 3 | 40 min. | 1 hr. | 4 hours | " | 1.89 | 68 | 19.8 |
| 14 | 3 | 10 min. | 20 min. | 2 hours | " | 1.84 | 438 | 149.8 |
| 15 | 3 | 25 min. | 45 min. | 3 hours | " | 1.83 | 451 | 166.1 |
| 16 | 3 | 10 min. | 20 min. | 2 hours | " | 1.84 | 443 | 136.2 |
| 17 | 3 | 5 min. | 10 min. | 30 min. | " | 1.98 | 592 | 167.3 |
| 18 | 3 | 5 min. | 10 min. | 30 min. | " | 1.97 | 475 | 132.9 |
| 19 | 3 | 8 min. | 15 min. | 1 hour | " | 2.00 | 218 | 39.3 |
| 20 | 3 | 8 min. | 15 min. | 1 hour | " | 1.94 | 150 | 20.1 |
| 21 | 3 | 30 min. | 1 hour | 24 hrs. | " | 2.10 | 315 | 68.6 |
| 22 | 3 | 25 min. | 1 hour | 24 hrs. | " | 2.04 | 225 | 8.4 |
| 23 | 3 | 3 min. | 1 hour | 24 hrs. | " | 1.87 | 143 | 12.4 |
| 24 | 3 | 3 min. | 10 min. | 2 hours | " | 1.74 | 99 | 29.0 |
| 25 | 3 | 5 min. | 15 min. | 3 hours | " | 1.77 | 26 | 11.2 |
| 26 | 3 | 30 min. | 2 hrs. | 24 hrs. | " | 1.86 | 105 | 36.7 |
| 27 | 3 | 1 min. | 5 min. | 1 hour | " | 1.85 | 114 | 29.9 |
| 28 | 3 | 15 min. | 30 min. | 3 hrs. | " | 1.90 | 10 | 4.7 |
| 29 | 3 | 30 min. | 3 hrs. | 24 hrs. | " | 1.93 | 38 | 16.8 |
| 30 | 3 | 15 min. | 1 hr. | 12 hrs. | " | low | | |
| 31 | 3 | 30 min. | 5 hrs. | 24 hrs. | " | strength | | |
| 32 | 3 | 1 hr. | 10 hrs. | 2 days | " | values | | |
| 33 | 3 | 3 min. | 10 min. | 2 hours | " | 1.77 | 63 | 24.6 |
| 34 | 3 | 3 min. | 8 min. | 2 hours | " | 1.76 | 161 | 28.1 |
| 35 | 3 | 5 min. | 30 min. | 4 hours | " | 1.90 | 306 | 52.7 |
| 36 | 3 | 3 min. | 10 min. | 3 hours | " | 1.99 | 413 | 59.7 |
| 37 | 3 | 10 min. | 30 min. | 5 hours | " | 1.94 | 334 | 62.0 |
| 38 | 3 | 5 min. | 20 min. | 3 hours | " | 1.87 | 153 | 49.1 |
| 39 | 3 | 60 min. | 5 hrs. | 23 hrs. | " | 1.86 | 169 | 4.2 |
| 40 | 3 | 3 min. | 10 min. | 2 hours | " | 1.87 | 183 | 15.9 |
| 41 | 3 | 10 min. | 30 min. | 4 hours | " | 1.80 | 206 | 25.0 |
| 42 | 3 | 5 min. | 10 min. | 2 hours | porous | no measurement obtainable | | |
| 43 | 3 | 15 min. | 2 hrs. | 8 hours | compact | 1.88 | 78 | 21.1 |
| 44 | 3 | 10 min. | 2 hrs. | 6 hours | " | 1.90 | 109 | 26.9 |
| 45 | 3 | 2 min. | 5 min. | 10 min. | porous | no measurement obtainable | | |
| 46 | 3 | 15 min. | 30 min. | 6 hours | compact | 2.01 | 306 | 58.5 |
| 47 | 3 | 5 min. | 20 min. | 12 hrs. | porous | no measurement obtainable | | |
| 48 | 3 | 5 min. | 20 min. | 12 hrs. | porous | no measurement obtainable | | |
| 49 | 3 | 3 min. | 15 min. | 4 hours | compact | 1.83 | 92 | 29.3 |
| 50 | 3 | 5 min. | 20 min. | 6 hours | " | | | |
| blank value | 3 | 1 hr. | 6 hrs. | 24 hours | " | 1.84 | 71 | 29.4 |
| blank value | 3 | 1 hr. | 6 hrs. | 29 hours | " | 1.93 | 145 | 55.0 |

EXAMPLE 51:

To demonstrate the hydrophobic effect obtained by adding polyisocyanates which contains ionic groups in the manufacture of concrete, test samples A and B measuring 4 cm × 4 cm × 16 cm were prepared as described as in Example 1 from the following formulations:

A
- 70 parts by weight of cement PZ 350 F
- 440 parts by weight of building sand according to Example 1
- 100 parts by weight of water B
- 70 parts by weight of cement PZ 350 F
- 440 parts by weight of building sand according to Example 1
- 100 parts by weight of water
- 51 parts by weight of polyisocyanate A 5.

The samples were left to harden at room temperature for 7 days and then stored under water at room temperature. The amount of water absorbed during the next eight days was determined in g.

| Time | Water absorption (in g) A | Water absorption (in g) B |
|---|---|---|
| 3 hours | 31.9 | 6.9 |
| 5 hours | 32.0 | 7.4 |
| 24 hours | 33.2 | 8.3 |
| 48 hours | 34.4 | 10.5 |
| 72 hours | 34.8 | 12.8 |
| 8 days | 35.6 | 19.6 |

The test showed that a hydrophobic concrete material was obtained when polyisocyanate A 5 is used.

EXAMPLE 52:

10 g of polyisocyanate A 5 were emulsified in 100 g of water with the aid of a high-speed stirrer and this emulsion was used immediately to treat 30 g of glass fibers (cut glass silk, 6 mm length). The mixture was stacked to a height of about 1 cm in a small mold and excess water was pressed out. The moist material was then dried at 120°C for 4 hours. A solid slab of glass-fiber-polyurea composite material which was incombustible and eminently suitable for insulating purposes was obtained.

EXAMPLE 53:

35 g of asbestos fibers (Canada asbestos <2 mm) were stirred into 200 g of water. 5 g of polyisocyanate A 24 were then mixed into the suspension. The resulting composition, which could be spread-coated with a trowel, was eminently suitable for filling the joints of cable fractures since it was easily applied, had high flame resistance in the case of fire and could easily be removed when the cables were re-laid. The composite material of polyurea and asbestos fibers was still deformable after several hours at room temperature, had a gross density of 0.2 g/cm$^2$ after drying (8 hours/120°C) and had little mechanical strength.

EXAMPLE 54:

200 g of Portland cement PZ 350 F and 10 g of polyisocyanate A 5 were stirred successively into 150 g of water. 30 g of glass fibers according to Example 52 were incorporated in the liquid mixture and the whole mixture was then introduced into a small mold about 2 cm in height.

After 2 days' drying at room temperature, a stone-hard composite material of cement, glass fibers and polyurea was obtained. The hardening time could, of course, be reduced by drying at higher temperatures, e.g. it was only 4 hours at 120°C.

EXAMPLE 55:

120 g of polyisocyanate A 55 and 100 g of a polyol (polypropylene oxide - trihydric alcohol with an average molecular weight of 450 which had been started on trimethylolpropane) were stirred together for one minute, and 100 g of finest wood chips (water content 8% by weight) were then introduced into the liquid mixture and the whole was thoroughly mixed (1 minute).

The resulting mixture, which could be spread-coated with a trowel, was introduced into a mold where it began to foam after a few minutes with heating and had become hard 2 hours later. A hard, porous composite material which had urethane groups and urea groups and contained wood chips was obtained which had a density of 94 kg/m$^3$ and a compression strength of 1.6 kg/cm$^2$. If the foaming and hardening process were carried out at 120°C, the composite material obtained had a still lower gross density, namely 59 kg/m$^3$.

EXAMPLE 56:

A composite material was produced as described in Example 55 from 100 g of polyisocyanate A 22, 50 g of the polyol described in Example 55 and 70 g of finest wood chips (water content 8% by weight). The foaming process set in immediately after the components had been mixed and was completed 5 minutes later at room temperature. The resulting hard, foam-like composite material containing wood chips had a density of 40 kg/m$^3$.

EXAMPLE 57:

50 g of polyisocyanate and 50 g of polyol according to Example 55 were stirred together for about 30 seconds and 100 g of finest wood chips described in Example 55 were then mixed in after 3 minutes. The mixture was spread out to form a 2 cm thick layer. 24 hours later, it had solidified to a rock-hard non-porous, high-strength material.

EXAMPLE 58:

100 g of polyisocyanate A 5 were mixed with 20 g of the polyol described in Example 55 and 20 g of water for 1 minute. This mixture was then mixed with 13 g of soft foam flakes of polyurethane scrap (unit weight 25 kg/m$^3$, average diameter of flakes 5–10 mm) and introduced into a mold where it was compressed to 2/3 of its original volume. The mixture heated up and hardened within 10 minutes. A hard, relatively homogeneous, foam-like composite material with a density of 170 kg/m$^3$ and a compression strength of 6.7 kp/cm$^2$ was obtained.

EXAMPLE 59:

| | |
|---|---|
| 150 g of polyisocyanate A | component I |
| 25 g of trichlorofluoromethane | |
| 200 g of a 45 percent suspension of calcium hydroxide in water | component II |
| 3 g of triethylamine | |

The two components were vigorously stirred together for 15 seconds. The mixture foamed up 25 seconds after the beginning of mixing and had become hard after 5 minutes. A finely cellular, open-pored hard foam with a density of 360 and a high compression strength was obtained.

Similar results were obtained if 50 g of cement were added to the isocyanate component before mixing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a composite material which comprises:
   A. mixing
      i. from 1–90 percent by weight of an organic polyisocyanate which contains 2–200 milliequivalents of ionic groups or groups which are capable of forming ionic groups in the presence of alkaline or organic basic compounds, per 100 grams of polyisocyanate,
      ii. from 10–99 percent by weight of an organic or inorganic particulate or fibrous material, and
   B. allowing the resultant mixture to react.

2. The process of claim 1, wherein said polyisocyanate is an ionic group-containing phosgenation product of aniline/formaldehyde condensation.

3. The process of claim 1, wherein the organic or inorganic particulate or fibrous material has a diameter of 1 mµ to 100 mm.

4. The process of claim 1, wherein an activator or an emulsifier is included in the mixture.

5. The process of claim 1, wherein the particulate material is an aqueous suspension of an inorganic hydraulic binder, and a blowing agent is included in the mixture.

6. The process of claim 1, wherein a calcium hydroxide suspension is the inorganic material.

7. The process of claim 1, wherein a catalytic amount of catalyst which promotes the formation of isocyanurates from -NCO groups is included in the mixture and the resultant product is a polyisocyanurate.

8. The process of claim 1, wherein an organic compound containing at least two groups containing hydrogen atoms reactive with an isocyanato group is included with the mixture.

9. The process of claim 1, wherein an organic compound which contains at least one hydrogen atom which is reactive with isocyanates is included in the mixture.

10. The process of claim 9, wherein the compound which contains hydrogen atoms which are reactive with isocyanates is water.

11. A composite material prepared by the process of claim 1.

12. The composite material of claim 11, which contains polyurea units, polyurethane units, polyisocyanurate units, or polycarbodiimide units, all of which units contain ionic groups.

13. The composite material of claim 1, prepared from a polyisocyanate which contains ionic groups, a hydraulic inorganic binder and water.

14. The composite material of claim 1, prepared from a polyisocyanate which contains ionic groups and an inert inorganic aggregate.

15. As a new article of manufacture, a shaped product comprising particles or fibers bonded together by a reaction product of an organic polyisocyanate containing 2–200 milliequivalents of ionic groups or groups capable of forming ionic groups in the presence of alkaline or organic basic compounds per 100 grams of polyisocyanate.

* * * * *